(12) United States Patent
Singh

(10) Patent No.: US 10,971,159 B2
(45) Date of Patent: Apr. 6, 2021

(54) CROSS ACCOUNT ACCESS FOR A VIRTUAL PERSONAL ASSISTANT VIA VOICE PRINTING

(71) Applicant: salesforce.com, inc., San Francisco, CA (US)

(72) Inventor: Prabhjot Singh, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 184 days.

(21) Appl. No.: 16/278,967

(22) Filed: Feb. 19, 2019

(65) Prior Publication Data

US 2020/0265842 A1 Aug. 20, 2020

(51) Int. Cl.
*G10L 15/32* (2013.01)
*G10L 15/22* (2006.01)
*G06F 21/32* (2013.01)
*G06F 9/451* (2018.01)
*G10L 17/00* (2013.01)

(52) U.S. Cl.
CPC .............. *G10L 15/32* (2013.01); *G06F 9/453* (2018.02); *G06F 21/32* (2013.01); *G10L 15/22* (2013.01); *G10L 17/00* (2013.01)

(58) Field of Classification Search
CPC ......... G10L 15/32; G10L 15/22; G10L 17/00; G06F 9/453; G06F 21/32
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Mohammad K Islam
(74) *Attorney, Agent, or Firm* — LKGlobal | Lorenz & Kopf, LLP

(57) ABSTRACT

A method for accessing a virtual personal assistant has been developed. First, a trust relationship is established between a primary smart speaker device that allows a user to access the virtual personal assistant with voice commands and a separate secondary smart speaker device. A trust relationship is established by generating a request at the secondary smart speaker device to allow access the virtual personal assistant with voice print authentication from the user and then validating the request at the primary smart speaker device to confirm the authenticity of the request. Next, a voice input is received from the user at the secondary smart speaker device requesting access to the virtual personal assistant. The identity of the user is verified using voice print identification with the secondary smart speaker device. Access for the user is then granted to the virtual personal assistant using the secondary smart speaker device.

15 Claims, 3 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,063,538 B2 * | 8/2018 | Lee ................. G06F 21/40 |
| 10,425,407 B2 * | 9/2019 | Talmor ............. H04L 63/083 |
| 10,748,546 B2 * | 8/2020 | Kim ................. G06F 3/167 |
| 10,789,957 B1 * | 9/2020 | Tiwari .............. H04W 12/06 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon M T et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0047605 A1 * | 2/2011 | Sontag ............. G06F 21/32 726/7 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0186636 A1 * | 7/2015 | Tharappel ......... H04L 9/3231 726/8 |
| 2016/0191514 A1 * | 6/2016 | Talmor ......... G06Q 20/40145 726/4 |
| 2016/0261582 A1 * | 9/2016 | Lee ................. G06F 21/31 |
| 2019/0034604 A1 * | 1/2019 | Zheng ............. G10L 15/30 |

\* cited by examiner

CROSS ACCOUNT ACCESS FOR A VIRTUAL PERSONAL ASSISTANT VIA VOICE PRINTING

TECHNICAL FIELD

Embodiments of the subject matter described herein relate generally to accessing a virtual personal assistant More particularly, embodiments of the subject matter relate to a method and system for cross account access for virtual personal assistant via voice printing.

BACKGROUND

A virtual personal assistant (VPA) has gained widespread popularity and usage in recent years. The virtual personal assistant is often accessed via a smart speaker device using voice commands. However, a virtual personal assistant may typically only be accessed from a designated smart speaker device. Accordingly, it is desirable to allow cross account access for virtual personal assistant through multiple smart speaker devices via voice printing.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
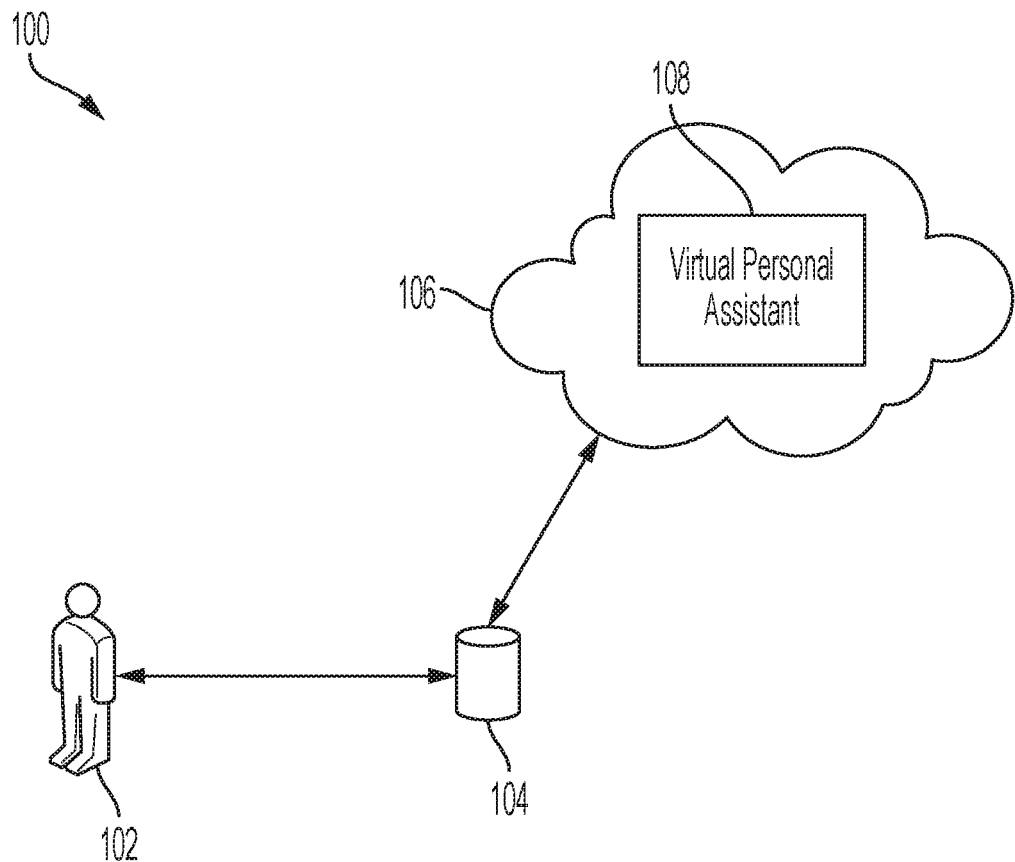
FIG. 1 is a block diagram of a user of a primary smart speaker device used to access a virtual personal assistant in accordance with one embodiment.

A method and system for allowing cross account access for virtual personal assistant through multiple smart speaker devices via voice printing has been developed. First, a "trust relationship" is established between a primary smart speaker device that allows a user to access the virtual personal assistant (VPA) with voice commands and a secondary smart speaker device that is separate from the primary sports beaker device. The trust relationship is established by generating a request at the secondary smart speaker device for the user to access the virtual personal assistant. The request includes "voice print" authentication information from the user. The request must be validated at the primary smart speaker device to confirm the authenticity of the request. Once the trust relationship is established, a voice input from the user may be received at the secondary smart speaker device that requests access to the virtual personal assistant. The identity of the user is verified using voice print identification with the secondary smart speaker device. Once the user's identity has been verified, access is granted to the virtual personal assistant using the secondary smart speaker device.

A "smart speaker" is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response. A smart speaker with a touchscreen is known as a smart display. While similar in form factor to tablet computers, smart displays differ in their emphasis on a hands-free user interface and virtual assistant features.

A "virtual personal assistant" or "intelligent personal assistant" is a software agent that can perform tasks or services for an individual. Sometimes the term "chatbot" is used to refer to virtual assistants generally or specifically those accessed by online chat (or in some cases online chat programs that are for entertainment and not useful purposes). Virtual assistants are able to interpret human speech respond via synthesized voices. Users can ask their assistants questions, control home automation devices, place online orders and media playback via voice, and manage other basic tasks such as email, to-do lists, and calendars with verbal commands.

The capabilities and usage of virtual assistants have expanded rapidly, with new products entering the market and a strong emphasis on voice user interfaces. For example, Apple and Google have installed bases of users on smartphones, Microsoft has an installed base of users for Windows-based personal computers, smartphones and smart speakers, and Amazon's Alexa has an install base of users for smart speakers.

Virtual assistants may work via: text, especially in an instant messaging app or other app; voice, (e.g., Amazon Alexa on the Amazon Echo device, Siri on an iPhone, or Google Assistant on Google-enabled/Android mobile devices); and taking and/or uploading images (e.g., Samsung Bixby on the Samsung Galaxy S8). Some virtual assistants are accessible via multiple methods, such as Google Assistant via chat on the Google Allo app and via voice on Google Home smart speakers. A wake word or words are typically used to activate a virtual assistant using voice. Virtual assistants use natural language processing (NLP) to match user text or voice input to executable commands. Many continually learn using artificial intelligence techniques including machine learning. The virtual assistant may be represented by an avatar of (a.k.a. 'interactive online character or automated character)—known as an embodied agent.

Virtual assistants may be integrated into many types of platforms or across several of them, including: smart speakers; instant messaging apps and platforms; operating systems (OS) for mobile devices; smart phones independent of the OS; mobile apps; mobile apps for specific companies and organizations; smart watches; and appliances (e.g., cars, glasses, clothing). Virtual assistants can provide a wide variety of services, including: providing information such as weather; setting alarms; making to-do or shopping lists; search engine functions; playing music from streaming services; playing videos, television, or movies from streaming services; public interactions on behalf of organizations; complement and/or replace customer service; and conversational commerce.

Conversational commerce is e-commerce via various techniques of messaging, including voice assistants but also live chat on e-commerce Web sites, live chat on messaging apps. It should be understood that a virtual digital assistant may be utilized across many industry sectors such as automotive, telecommunications, retail, healthcare and education.

Virtual assistants have a variety of associated privacy concerns. Modes of privacy have been used to create a multilayer authentication for virtual assistants utilizing speaker recognition. "Speaker recognition" is the identification of a person from characteristics of voices. It is used to answer the question "Who is speaking?" The term voice recognition can refer to speaker recognition or speech recognition. Speaker verification (also called speaker authentication) contrasts with identification, and speaker recognition differs from speaker diarisation (recognizing when the same speaker is speaking).

Recognizing the speaker can simplify the task of translating speech in systems that have been trained on specific voices or it can be used to authenticate or verify the identity of a speaker as part of a security process. Speaker recognition uses the acoustic features of speech that have been found to differ between individuals. These acoustic patterns reflect both anatomy and learned behavioral patterns.

There are two major applications of speaker recognition technologies and methodologies. If the speaker claims to be of a certain identity and the voice is used to verify this claim, this is called verification or authentication. On the other hand, identification is the task of determining an unknown speaker's identity. In a sense, speaker verification is a 1:1 match where one speaker's voice is matched to a particular template whereas speaker identification is a 1:N match where the voice is compared against a certain amount (N) of templates.

From a security perspective, identification is different from verification. Speaker verification is usually employed as a "gatekeeper" in order to provide access to a secure system. These systems operate with the users' knowledge and typically require their cooperation. Speaker identification systems can also be implemented covertly without the user's knowledge to identify talkers in a discussion, alert automated systems of speaker changes, check if a user is already enrolled in a system, etc. In some applications, it is common to first perform a speaker identification process to create a list of "best matches" and then perform a series of verification processes to determine a conclusive match.

Speaker recognition systems have two phases: enrollment and verification. During enrollment, the speaker's voice is recorded and typically a number of features are extracted to form a voice print, template, or model. In the verification phase, a speech sample or "utterance" is compared against a previously created voice print. For identification systems, the utterance is compared against multiple voice prints in order to determine the best match(es) while verification systems compare an utterance against a single voice print. Because of the process involved, verification is faster than identification.

Speaker recognition systems fall into two categories: text-dependent and text-independent. If the text must be the same for enrollment and verification this is called "text-dependent" recognition. In a text-dependent system, prompts can either be common across all speakers (e.g., a common pass phrase) or unique. In addition, the use of shared-secrets (e.g., passwords and PINs) or knowledge-based information can be employed in order to create a multi-factor authentication scenario.

"Text-independent" systems are most often used for speaker identification as they require very little, if any, cooperation by the speaker. In this case, the text during enrollment and test is different. In fact, the enrollment may happen without the user's knowledge, as in the case for many forensic applications. As text-independent technologies do not compare what was said at enrollment and verification, verification applications tend to also employ speech recognition to determine what the user is saying at the point of authentication. In text independent systems both acoustics and speech analysis techniques are used.

Speaker recognition is a pattern recognition problem. The various technologies used to process and store voice prints include frequency estimation, hidden Markov models, Gaussian mixture models, pattern matching algorithms, neural networks, matrix representation, vector quantization and decision trees. For comparing utterances against voice prints, more basic methods like cosine similarity are traditionally used for their simplicity and performance. Some systems also use "anti-speaker" techniques such as cohort models and world models. Spectral features are predominantly used in representing speaker characteristics.

Ambient noise levels can impede both collections of the initial and subsequent voice samples. Noise reduction algorithms can be employed to improve accuracy, but incorrect application can have the opposite effect. Performance degradation can result from changes in behavioral attributes of the voice and from enrollment using one telephone and verification on another telephone. Integration with two-factor authentication products is expected to increase. Voice changes due to ageing may impact system performance over time. Some systems adapt the speaker models after each successful verification to capture such long-term changes in the voice, though there is debate regarding the overall security impact imposed by automated adaptation.

Turning now to FIG. 1, a block diagram 100 is shown of a user 102 of a primary smart speaker device 104 used to access a virtual personal assistant 108 in accordance with one embodiment. In this example, the user 102 activates the primary smart speaker device 104 with a hot word command. The smart speaker device 104 verifies the identity of the user 102 and allows access to the virtual personal assistant 108 which is located on a cloud-based network 106 in this embodiment.

Figure 2:
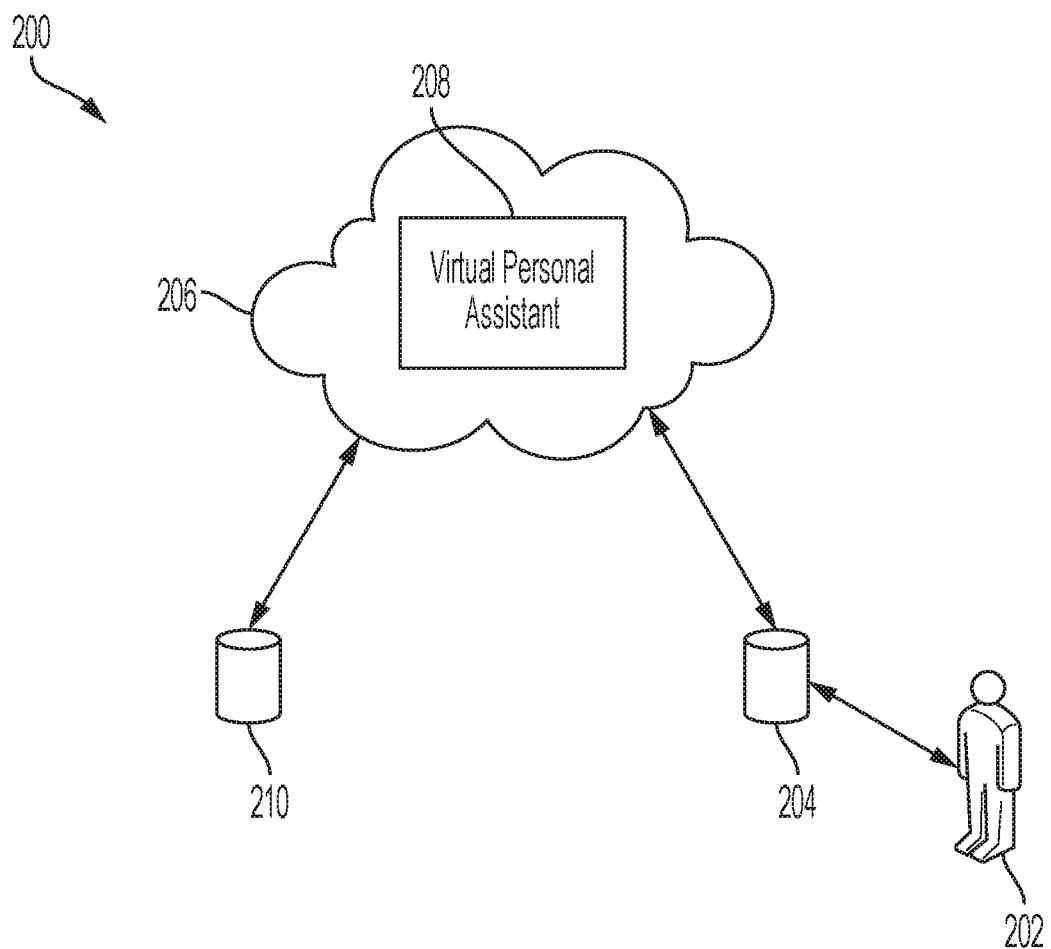
FIG. 2 is a block diagram of a user of a secondary smart speaker device used to access of virtual personal assistant in accordance with one embodiment.

Turning now to FIG. 2, a block diagram 200 is shown of a user 202 of a secondary smart speaker device 204 used to access of virtual personal assistant 208 in accordance with one embodiment. In this embodiment, the user 202 attempts to access the virtual personal assistant 208 from a secondary smart speaker device 204. As shown previously in FIG. 1, the virtual personal assistant 108 is located on a cloud-based network 106.

Before the secondary smart speaker device 204 allows the user 202 to access the virtual personal assistant 208, a trust relationship must be established between the secondary smart speaker device 204 and the primary smart speaker device 210. The trust relationship is established by first generating a request at the secondary smart speaker device 204 to allow the user 202 to access the virtual personal assistant 208 through the secondary device 204. The user 202 provides voice print authentication information to the secondary smart speaker device 204 as part of the request. Next, the request for access to the virtual personal assistant 208 through the secondary device must be validated at the primary smart speaker device 210 by the user 202 to confirm the authenticity of the request. In other embodiments, the user 202 may provide voice print authentication information to the primary smart speaker device 210 as part of the request. The request for access to the virtual personal assistant 208 through the primary device must be validated in the same manner as described previously by the user 202 to confirm the authenticity of the request. The validation occurs at the primary speaker device 210.

Once the trust relationship is established between the primary smart speaker device 210 and the secondary smart speaker device 204, the user 202 may request access to the virtual personal assistant 208 with a voice input request. The secondary smart speaker device 204 will verify the identity of the user using voice print identification. Once the identity of the user 202 is verified, the user may access the virtual personal assistant 208 through the secondary smart speaker device 204.

In some embodiments, the authentication at the secondary smart speaker device 204 is based off a voice imprint that may include random phrases requested from the user 202. The voice imprint may be analyzed for the modulation and tone of the user's speech. Additional verification may be required such as an account number, a personal identification number (PIN), an email identification address, password, or text/email verification number through a smart phone, mobile device or email address.

In other embodiments, the authorization to access the virtual personal assistant 208 through the secondary smart speaker device 204 may be deactivated and/or removed. In various embodiments, this deactivation may be permanent or only temporary. Deactivation serves to allow the secondary smart speaker device 204 to return to use by its primary owner while preventing access to the user's 202 virtual personal assistant 208. Deactivation of the user's 202 access may occur and several ways. In one example, the secondary smart speaker device 204 continually monitors the audio input from the user 202 to continuously confirm the identification using voice print identification. If the secondary smart speaker device 204 determines at any point that the user 202 is no longer speaking, the access to the virtual personal assistant 208 is deactivated. In other examples, the user's 202 access to the virtual personal assistant 208 may be deactivated after a specified time period of inactivity from the user 202. In still other examples, the owner of the secondary smart speaker device 204 or the owner of the primary smart speaker device 210 (i.e., the user 202) may instruct the secondary smart speaker device 204 to deactivate the access to the virtual personal assistant 208. These instructions from either party may deactivate the access temporarily. Additionally, the secondary smart speaker device 204 or the primary smart speaker device 210 may be instructed to deactivate the access to the virtual personal assistant 208 permanently. Permanent deactivation effectively removes the ability for the user 202 to access the virtual personal assistant 28 through the secondary smart speaker device 204.

In other embodiments, authentication of the user 202 may be accomplished with different levels and permissions granted by the virtual personal assistant. These levels of authentication may be restrictive based upon the level of certainty of the identification of the user 202. For example, the user may be allowed to make e-commerce purchases only up to a certain level (e.g., $50) with only a voice print identification. Purchases greater than this amount may require additional authentication steps.

Figure 3:
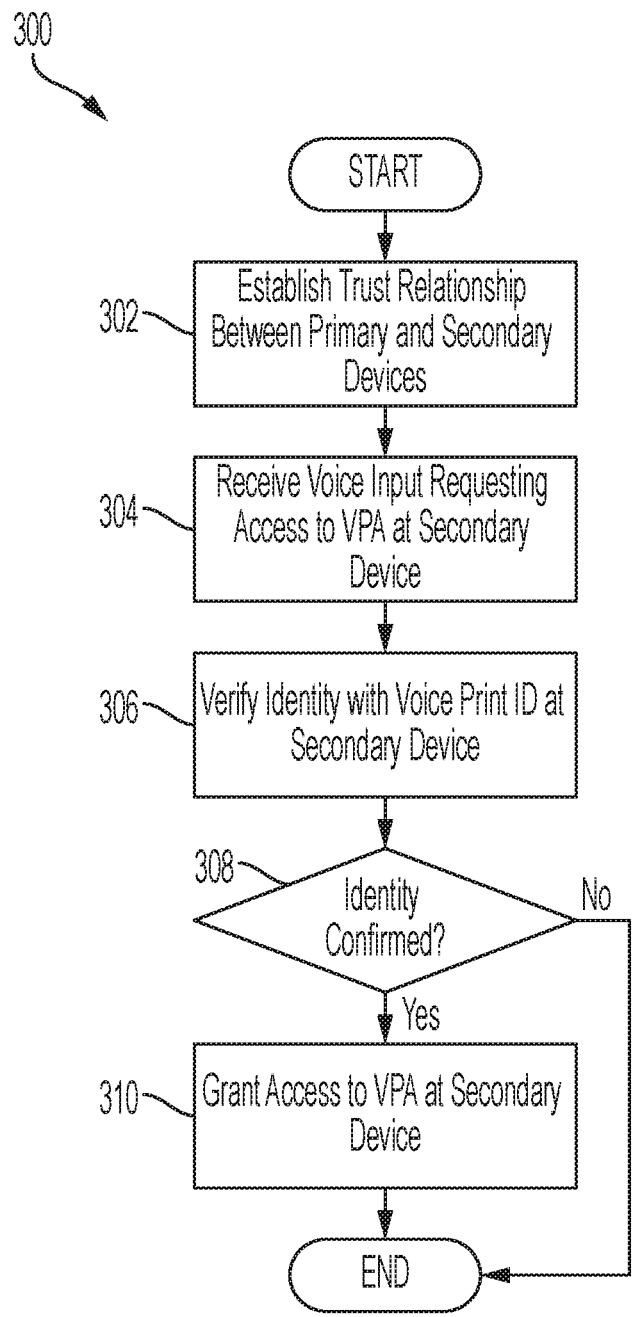
FIG. 3 is a flowchart for a method of accessing a virtual personal assistant through a secondary smart speaker device in accordance with one embodiment.

Turning now to FIG. 3, a flowchart 300 is shown for a method of accessing a virtual personal assistant through a secondary smart speaker device in accordance with one embodiment. In this embodiment, a trust relationship is established between the primary smart speaker device and the secondary smart speaker device to allow a user to access a virtual personal assistant at the secondary smart speaker device 302. The trust relationship is established by generating a request to allow the user to access the virtual personal assistant through the secondary smart speaker device. The access request includes voice print authentication information from the user. The access request is validated by the user at the primary smart speaker device to confirm the authenticity of the request. Once the trust relationship is established, the user may request access to the virtual personal assistant at the secondary smart speaker device via a voice input 304. The identity of the user is verified using voice print identification at the secondary smart speaker device 306. Once the user's identity is confirmed 308, the user is granted access to the virtual personal assistant at the secondary smart speaker device 306.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with the process may be performed by software, hardware, firmware, or any combination thereof. For illustrative purposes, the following description of the process may refer to elements mentioned above in the figures. In practice, portions of the process may be performed by different elements of the described system, e.g., component A, component B, or component C. It should be appreciated that the process may include any number of additional or alternative tasks, the tasks shown need not be performed in the illustrated order, and the process may be incorporated into a more comprehensive procedure or process having additional functionality not described in detail herein. Moreover, one or more of the tasks could be omitted from an embodiment of the process as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for accessing a virtual personal assistant, comprising:
    establishing a trust relationship between a primary smart speaker device that allows a user to access the virtual personal assistant with voice commands and a secondary smart speaker device that is separate from the primary smart device, where the trust relationship is established by,
        generating a request at the secondary smart speaker device to allow the secondary smart speaker device to access the virtual personal assistant, where the request includes voice print authentication information from the user, and
        validating the request at the primary smart speaker device to confirm the authenticity of the request;
    receiving a voice input from the user at the secondary smart speaker device, where the voice input is a request for accessing the virtual personal assistant;
    verifying the identity of the user using voice print identification with the secondary smart speaker device; and
    granting access for the user to the virtual personal assistant using the secondary smart speaker device, where access to the virtual personal assistant using the secondary smart speaker device is limited based on the degree of certainty of the identity of the user and based on a limit on e-commerce purchase amounts.

2. The method of claim 1, where the virtual personal assistant is located on a cloud-based network.

3. The method of claim 1, where the secondary smart speaker device is a mobile device.

4. The method of claim 3, where the mobile device is a smart phone.

5. The method of claim 3, where the mobile device is a tablet.

6. The method of claim 1, where the voice print authentication information comprises random phrases spoken by the user.

7. The method of claim 6, where the random phrases spoken by the user are generated by the secondary smart speaker device.

8. The method of claim 1, where the secondary smart speaker device requires additional authentication to verify the identity of the user.

9. The method of claim 8, where the additional authentication is an account number for the virtual personal assistant.

10. The method of claim 8, where the additional authentication is an email address of the user.

11. The method of claim 8, where the additional authentication is a password of the user.

12. The method of claim 8, where the additional authentication is a personal identification number (PIN) of the user.

13. The method of claim 8, where the additional authentication is a text verification sent to a user's smart phone.

14. The method of claim 8, where the additional authentication is a verification number sent to the user.

15. An apparatus for accessing a virtual personal assistant, comprising:

a processor; and a memory coupled to the processor, where the memory includes computer program instructions capable of, establishing a trust relationship between a primary smart speaker device that allows a user to access the virtual personal assistant with voice commands and a secondary smart speaker device that is separate from the primary smart device, where the trust relationship is established by, generating a request at the secondary smart speaker device to allow the secondary smart speaker device to access the virtual personal assistant, where the request includes voice print authentication information from the user, and validating the request at the primary smart speaker device to confirm the authenticity of the request;

receiving a voice input from the user at the secondary smart speaker device, where the voice input is a request for accessing the virtual personal assistant, verifying the identity of the user using voice print identification with the secondary smart speaker device, and granting access for the user to the virtual personal assistant using the secondary smart speaker device, where access to the virtual personal assistant using the secondary smart speaker device is limited based on the degree of certainty of the identity of the user and based on a limit on e-commerce purchase amounts.

* * * * *